United States Patent [19]

Kruyer

[11] Patent Number: 4,529,496
[45] Date of Patent: Jul. 16, 1985

[54] METHOD AND APPARATUS FOR SEPARATING SLURRIES AND EMULSIONS

[76] Inventor: Jan Kruyer, 9707-67A St., Edmonton, Alberta, Canada, T6B 1S3

[21] Appl. No.: 178,100

[22] Filed: Aug. 14, 1980

[30] Foreign Application Priority Data

Aug. 15, 1979 [CA] Canada ............................ 833830

[51] Int. Cl.³ .............................................. C10G 1/04
[52] U.S. Cl. ................................ 208/11 LE; 210/671; 210/693; 210/924
[58] Field of Search ......................... 208/11 LE, 8 LE; 210/671, 693, 924

[56] References Cited

U.S. PATENT DOCUMENTS

| | | | |
|---|---|---|---|
| 3,399,765 | 9/1968 | Puddington et al. | 208/11 LE |
| 3,846,276 | 11/1974 | Walker | 208/11 LE |
| 4,029,568 | 6/1977 | Pittman et al. | 208/11 LE |
| 4,224,138 | 9/1980 | Kruyer | 208/11 LE |
| 4,236,995 | 12/1980 | Kruyer | 208/11 LE |

FOREIGN PATENT DOCUMENTS

| | | | |
|---|---|---|---|
| 718881 | 9/1965 | Canada | 208/11 LE |
| 778347 | 2/1968 | Canada | 208/11 LE |

Primary Examiner—Charles F. Warren
Assistant Examiner—Joseph A. Boska
Attorney, Agent, or Firm—Thorpe, North & Western

[57] ABSTRACT

A mixture containing dispersed phase and continuous aqueous phase, with particulate solids being part of either or both phases, is separated by passing it one or more times through apertures in an endless oleophilic conveyor belt in a separation zone wherein bitumen phase adheres to the belt and bitumen adhering to the belt is conveyed to one or more bitumen treatment zones and to a recovery zone where bitumen is removed from the belt. The end rolls of the belt are not immersed in a water bath; however, portions of the belt, while in the separation, treatment and recovery zones, may be partly or completely in an aqueous environment. More than one set of separation, treatment and recovery zones may be used on the same endless belt conveyor. Also, a mixture containing dispersed aqueous phase and continuous bitumen or oil phase, and possibly gas, is deposited onto an apertured oleophilic endless belt conveyor and is treated in one or more treatment zones and is then removed from the belt.

47 Claims, 13 Drawing Figures

METHOD AND APPARATUS FOR SEPARATING SLURRIES AND EMULSIONS

BACKGROUND OF THE INVENTION

The present invention relates to the use of an endless apertured oleophilic belt conveyor to separate a mixture of oil phase and aqueous phase wherein the belt conveyor is not immersed in a water bath. More particularly, this invention relates to a process wherein aqueous phase passes through the belt apertures and oil phase is captured by the surfaces of the oleophilic belt on which it is treated or conditioned and subsequently removed.

This invention is concerned with recovering bitumen from mined oil sand and for recovering bitumen or oil phase from oil and water mixtures produced from oil wells. Extensive deposits of oil sands, which are also known as tar sands and bituminuous sands, are found in Northern Alberta, Canada. The sands are composed of siliceous material with grains generally having a size greater than that passing a 325 mesh screen (44 microns) and a relatively heavy, viscous petroleum, called bitumen, which fills the voids between the grains in quantities of from 5 to 21 percent of total composition. (All percentages referred to herein are in weight percent unless noted otherwise.) Generally the bitumen content of the sand is between about 5 and 15 percent. This bitumen contains typically 4.5 percent sulfur and 38 percent aromatics. Its specific gravity at 60° F. ranges generally from about 1.00 to about 1.06. The oil sands also contain clay and silt. Silt is defined as siliceous material which will pass a 325 mesh screen, but which is larger than 2 microns. Clay is material smaller than 2 microns, including some siliceous material of that size. Extensive oil sands deposits are also found elsewhere in the world, such as in the Orinoco heavy oil belt of Venezuela and in the area near Vernal, Utah. The mineral and bitumen of these deposits differ somewhat from those of the Alberta deposits. Compared with the Alberta oil sands, the Utah deposit contains a coarser sand, less clay and an even more viscous bitumen.

Much of the world resource of bitumen and heavy oil is deeply buried by overburden. For example it has been estimated that only about 10 percent of the Alberta oil sand deposit is close enough to the earth's surface to be conveniently recovered by mining. The remainder is buried too deeply to be economically surface mined. Hydraulic mining or tunnel mining has been proposed for these deeper deposits. Generally, however, it is considered that enhanced recovery by steam injection, by injection of aqueous solutions, and/or by in-situ combustion may possibly be more effective for obtaining bitumen or heavy oil from deeply buried formations. Such enhanced recovery methods use one or more oil wells that penetrate the formation and stimulate or recover the resource. Recovery of bitumen from a well by steam stimulation is described in Canadian Pat. No. 822,985 granted on Sept. 16, 1969 to Fred D. Muggee. Depending upon the procedure employed, enhanced recovery methods either produce mixtures of oil, water and water-in-oil emulsions or produce oil-in-water emulsions.

There are several well known procedures for separating bitumen from mined oil sands. In a hot water method, such as disclosed in Canadian Pat. No. 841,581 issued May 12, 1979 to Paul H. Floyd et. al; the bituminous sands are jetted with steam and mulled with a minor amount of hot water and sodium hydroxide in a conditioning drum to produce a pulp which passes from the conditioning drum through a screen, which removes debris, rocks and oversize lumps, to a sump where it is diluted with additional water. It is hereinafter carried into a separation cell.

In the separation cell, sand settles to the bottom as tailings which are discarded. Bitumen rises to the top of the cell in the form of a bituminous froth which is called the primary froth product. An aqueous middlings layer containing some mineral and bitumen is formed between these layers. A scavenging step is normally conducted on this middlings layer in a separate flotation zone. In this scavenging step the middlings are aerated so as to produce a scavenger tailings product which is discarded and a scavenger froth product. The scavenger froth product is thereafter treated to remove some of its high water and mineral matter content and is thereafter combined with the primary froth product for further treatment. This combined froth product typically contains about 52 percent bitumen, 6 percent mineral, 41 percent water, all by weight, and may contain from 20 to 70 volume percent air. It resembles a liquid foam that is difficult to pump and, for that reason, is usually treated with steam to improve its flow characteristics.

The high water and mineral contents of the combined froth product normally are reduced by diluting it with a hydrocarbon diluent such as naptha. It is then centrifuged to produce a tailings product and a final bitumen product that typically contains essentially no water and about 1.3 percent solids and that is suitable for coking, hydrovisbreaking and other refining techniques for producing a synthetic crude oil. The tailings products, containing some naptha, are discarded.

There are basically four effluent streams from the Hot Water Process. Each carries with it some of the bitumen of the feed; thereby reducing the efficiency of the Process. These include the oversize material, the sand from the separation cells, the silt and clay from the scavenger cells and the tailings from the centrifuges. Up to 10 percent of the bitumen in the original feed and up to 2½ percent of the naptha stream may be lost in this manner. Much of this bitumen effluent finds its way into large retention ponds that are typical of the Hot Water Process. The bottom of one such retention pond may contain up to 50 percent dispersed mineral matter substantially of clay and silt as well as 5 percent bitumen. As disclosed in Canadian Pat. No. 975,697 issued on Oct. 7, 1975 to Davitt H. James, this part of the pond contents, referred to as sludge, is a potential source of bitumen.

The Hot Water Process described in the preceding paragraphs separates bitumen from a prepared oil sand slurry. Various methods for preparing oil sand slurries are taught in the prior art, as for example disclosed in Canadian Pat. No. 918,588 issued on Jan. 9, 1973 to Marshall R. Smith et. al. and in U.S. Pat. No. 3,968,572 issued on July 13, 1976 to Frederick C. Stuchberry. These apparatus as disclosed were especially designed to form a slurry that is hot, that contains finely dispersed air bubbles and wherein the bitumen is in the form of small flecks. Such a slurry is amenable to subsequent separation in a hot water bath, after dilution, wherein bitumen forms into a froth that rises to the top of the bath and is skimmed therefrom. Alkaline reagents such as sodium hydroxide are normally added in this Process to give to the slurry those properties that provide for efficient flotation of the bitumen in said water bath. However, in the presence of sodium hydroxide, fine clay particles in the effluent streams from this process do not settle readily. For this reason inordinately large settling ponds are required to contain the effluents from commercial hot water oil sands extraction plants.

The present invention applies to processes that get away from the bitumen flotation mechanism of the prior art and utilize apertured oleophilic endless conveyor belts to achieve slurry separations. These processes are superior to the Hot Water Process because separations are conducted at lower process temperatures and with lower water requirements. For comparable oil sand feedstocks the bitumen produced with an apertured oleophilic belt as disclosed herein is of higher quality than the froth produced by a Hot Water Process.

The apertured oleophilic conveyor belt, that may be used to separate emulsions, slurries, or mixtures of oil phase and aqueous phase, typically consists of a mesh belt that is woven from fibre, string or wire of high tensile strength and fatigue resistance that is oleophilic by nature or that will bond strongly with a belt coating that is oleophilic. This belt typically is supported by two conveyor end rolls that provide tension and form to the belt. Separation is achieved by passing a slurry, emulsion or mixture of oil phase and water phase, with or without particulate solids, through the belt one or more times. Water phase and particulate solids in the water phase pass through the belt apertures and are discarded while oil phase attaches itself to the belt because of its attraction for the oleophilic belt surfaces. The oil phase subsequently is recovered from said belt as a product. Certain related processes utilizing an apertured oleophilic belt for oil phase separation are disclosed in copending patent applications Ser. No. 37,896 and Ser. No. 37,897 both filed May 10, 1979 and now issued as U.S. Pat. Nos. 4,224,138 and 4,236,995 respectively.

BRIEF DESCRIPTION OF THE INVENTION

In accordance with the broadest concepts of the present invention a mixture of oil phase and aqueous phase is screened in a separation zone by an oleophilic apertured endless conveyor belt such that as much as possible of the aqueous phase passes through the belt apertures and is removed and as much as possible of the oil phase is captured by the oleophilic surfaces of the belt, is conveyed thereby and is recovered from the belt surface. Treatment to improve the oil phase product may be conducted on the oil phase prior to or after removal from the belt.

There are at least three ways in which the conveyor, that uses an apertured oleophilic belt for separation, may be mounted. Each may be uniquely adaptable for separating a particular feed mixture that contains oil and water with or without particulate solids. The conveyor may be inclined and be partly immersed in a water bath wherein the feed is separated by the belt under water and oil phase is removed from the belt above water as disclosed in copending patent application Ser. No. 37,897. A generally horizontal belt conveyor that is totally immersed in a water bath may be used instead, wherein separation of the feed and removal of oil phase from the belt both take place under water as disclosed in copending patent application Ser. No. 37,896. In the present invention, an apertured oleophilic endless belt conveyor is used wherein separation of the feed and recovery of the oil phase from the belt both take place without immersing either of the end rolls of the belt conveyor in a water bath. Thus, the environment surrounding the belt is generally ambient air. However, the use of other gases are not be precluded. Portions along either the top or bottom flights of the belt may be subjected to aqueous immersion or sprays as the belt rotates through various separation, treatment and recovery zones as will be described. The oil phase may be treated prior to removal from the belt to change its physical or chemical properties. The belt may be horizontal, declined or inclined.

In the preferred embodiment and oil sand slurry is separated by said belt in a separation zone wherein water and particulate solids pass through the belt apertures and bitumen is captured by the oleophilic belt surfaces and is carried to a treatment zone for removal of particulate solids and water, after which the bitumen is removed from the belt in a recovery zone for processing to a synthethis crude oil.

In a second embodiment an oil-in-water emulsion of oil sand bitumen or heavy oil is separated by said belt in a separation zone wherein water passes through the belt apertures and oil phase is captured by the oleophilic belt surfaces, and may be carried to a treatment zone for removal of water and/or clay, after which it is removed in a recovery zone from the belt for subsequent processing.

In a third embodiment a bitumen froth or any other water-in-oil emulsion is deposited onto said belt for the purpose of subsequent treatment on said belt, such as to remove air, water and/or solids or to, in other ways, change the physical or chemical properties of the oil product, after which it is removed from the belt for processing.

OBJECTS

An object of the present invention is to separate mined oil sands by a process that does not rely upon the principle of bitumen flotation to achieve separation, as is taught in the prior art, but that uses an apertured oleophilic belt instead to capture bitumen from an oil sand slurry.

A further object of the present invention is to recover additional bitumen from various bitumen or solids reduced streams or effluents from commercial hot water oil sands extraction plants.

Another object of the present invention is to separate bitumen or petroleum from oil-water mixtures or emulsions that are produced from an oil well when enhanced recovery techniques are used that employ injections of aqueous solutions or steam into the oil bearing formation for the purpose of recovering part of the oil from the formation; or that employ in-situ combustion for this same purpose.

An additional object of the present invention is to separate a slurry, emulsion, or oil-water mixture that has been pre-conditioned in a tumbler for the purpose of increasing the size of dispersed phase particles prior to separation.

A still different object of the present invention is to purify and to treat bitumen froth, or any other water-in-oil emulsion, in one or more treatment zones after this emulsion has taken the form of a coating or layer on a moving apertured oleophilic belt conveyor.

A yet further object of the present invention is to provide a bitumen or petroleum product that is amenable to further processing for producing a refined or semi-refined oil.

DETAILED DESCRIPTION OF THE INVENTION

For the purposes of the present invention "water-in-oil emulsion", "oil phase" and "bitumen" all refer to petroleum oil that may contain water droplets and/or particulate solids. "Bitumen froth" refers to bitumen that contains water phase and solids, and significant quantities of entrained gas. "Oil-in-water emulsion" refers to a stable mixture of small oil phase droplets dispersed in a continuous water phase and may contain up to about 5 percent particulate solids. "Slurry" refers to a mixture containing continuous water phase, dispersed oil phase and more than about 5 percent particulate solids. "Aqueous phase" refers to any type of continuous water phase; it may contain particulate solids, oil particles and/or chemicals and it generally is used to describe a slurry or emulsion that has passed or is to be passed through an apertured oleophilic belt. "Dispersed phase" refers to that phase in the mixture, emulsion or slurry that is not continuous.

The present invention is primarily drawn to the separation of bitumen from particulate solids and/or water. However, it is to be understood that the present invention may also be used to separate heavy or light oil from particulate solids and/or water in the same manner no matter from where they originate. For example, Canadian Pat. No.: 726,683 issued on Jan. 25, 1966 to Albert F. Lenhart discloses that oils derived from solid carbonaceous materials, such as from oil shales, coals, and the like, usually are recovered in the form of oil-water emulsions when in-situ combustion is practiced to convert these solid carbonaceous materials to oils. That some patent also discloses that in the recovery of conventional crude oil from wells, oil-water emulsions are produced as well on many occasions. A paper by L. A. Johnson et. al. of the United States Department of Energy, presented at the 13th Intersociety Energy Conversion Engineering Conference in San Diego, Calif. on Aug. 20-25, 1978 discloses that oil-water emulsions, containing particulate solids, usually are produced when oil is recovered by in-situ combustion of tar sands.

The present invention makes special use of an oleophilic apertured belt to capture bitumen particles, droplets and streamers from a slurry or mixture with water. The conveyor in general is not contained in a water bath as is taught in certain prior disclosures already referred to but is maintained in a gaseous atmosphere. Preferably this will be ambient air but could also be modified air, i.e. heated air, humid air, dry air, etc. The use of nitrogen oxygen or inert gases is not to be precluded. The belt may be housed in an open area or enclosed in a tunnel or cabinet. The probability of bitumen adhering to this belt in quantity generally increases with the size of bitumen particles in the mixture. U.S. Pat. No. 4,392,949 issued July 12, 1983 from copending patent application Ser. No. 178,001 filed Aug. 4, 1980, and U.S. Pat. No. 4,406,793 issued Sept. 27, 1983 from copending patent application Ser. No. 387,957 which was a continuation-in-part of Ser. No. 178,000 filed Aug. 14, 1980 disclose methods for preparing an oil sand slurry that is particularly suited to subsequent separation by the present invention. In general, oil sand, water and steam are mixed inside of a drum to continuously produce a smooth slurry wherein bitumen flecks are disengaged from the sand grains of the slurry. The drum is provided with oleophilic internal surfaces (such as apertured oleophilic baffles along the internal drum cylinder wall) that serve to unite the small bitumen flecks into droplets and streamers of bitumen that are easily captured by the oleophilic apertured belt of the present invention during subsequent separation. Oversize material such as rocks and lumps of clay, undigested oil sand and coarse sands may be removed from the produced slurry by means of screening, elutriation or other means.

Figure 1:
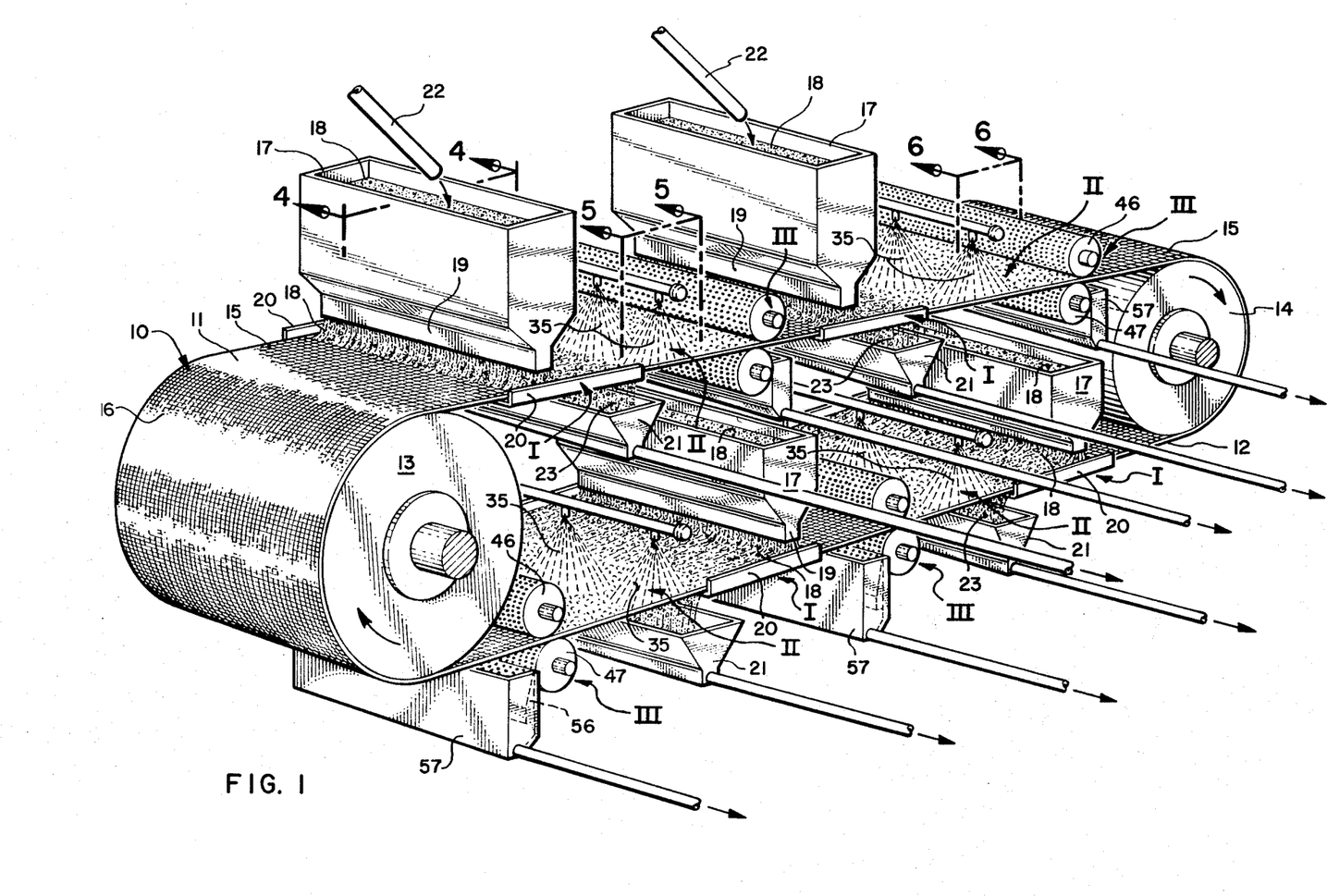
FIG. 1 is a perspective view of the apertured oleophilic endless belt separator, showing the locations of the various zones along the belt for separation, for treatment and for bitumen removal.

In the preferred embodiment of the present invention a previously prepared slurry or emulsion is transferred to one or more separation zones of a belt separator. With reference to FIG. 1, this separator consists of an endless apertured conveyor belt 10 having a top flight 11 and a bottom flight 12 stretched between two conveyor end rolls 13, 14. Roll 13 is larger in diameter than roll 14 for purposes that will be explained. These end rolls may be crowned to keep the belt 10 running centrally on the end rolls 13, 14. The various zones along the belt 10 are marked by Roman numerals I, II and III. Two sets of sequential zones are shown along the top belt flight 11, which in FIG. 1 is moving from left to right. Two sets of sequential zones are also shown along the bottom belt flight 12 which in the figure is moving from right to left. It is not intended that this invention be limited to this many zones only. Many more zones may be accommodated along the belt flights 11 and 12 when the distance between the endrolls 13 and 14 is increased. Conversely, fewer zones may be used and said distance may be decreased.

In the separation zones marked as I, a mixture of oil phase and aqueous phase is transported via hoppers 17 to the belt flights 11 and 12 and is separated in a process wherein aqueous phase passes through apertures of the belt to disposal means 21 and oil phase is retained by the belt. This oil phase coats oleophilic surfaces 15 of the belt flights 11 and 12.

In the zones marked as II, treatment of the oil phase retained by the moving belt flights 11 and 12 takes place. This treatment may include rolling, extrusion through apertures 16, blowing with gas, spraying with liquids 35, exposure to energy fields or waves, irradiation, chemical reaction, or any other treatment that may improve, purify or upgrade the oil phase for subsequent use or refining.

In the zones marked as III the oil phase is removed out of apertures 16 and from surfaces 15 of the belt flights 11 and 12 and is recovered by means of transfer rollers 46, recovery rollers 47 and doctor blades 56 or other means hereinafter described.

In cases where treatment of the oil phase is not desired each separation zone will be followed immediately with a recovery zone and treatment zones will not be found along the belt.

The belt may be inclined, horizontal or declined, as is most convenient for the practice of the present invention and for the mixtures that need to be separated. Preferably the belt declines in the direction of the belt movement such that separation zone I is more elevated than treatment zone II which in turn is higher than recovery zone III. For that reason end roll 13 has a larger diameter than end roll 14. However, it is not the intent to limit the invention to a declining belt, nor to limit the invention to the relative sizes of the end rolls.

SEPARATION

Figure 2:
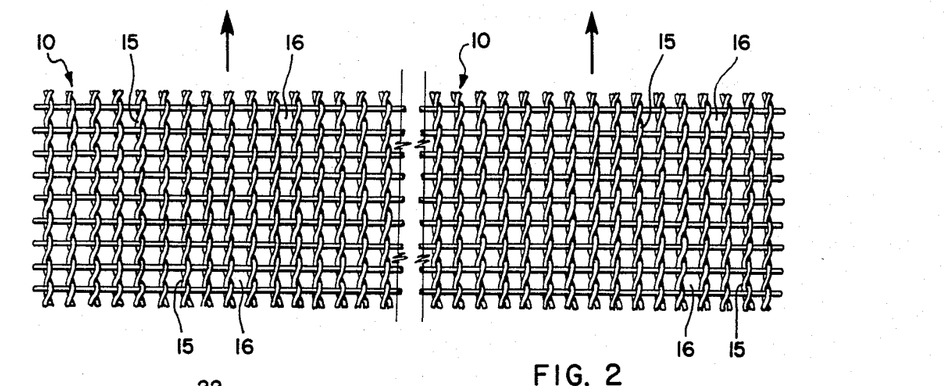
FIG. 2 is a detailed view of a section of an apertured oleophilic belt as used in the present invention.
Figures 3, 4, 5:
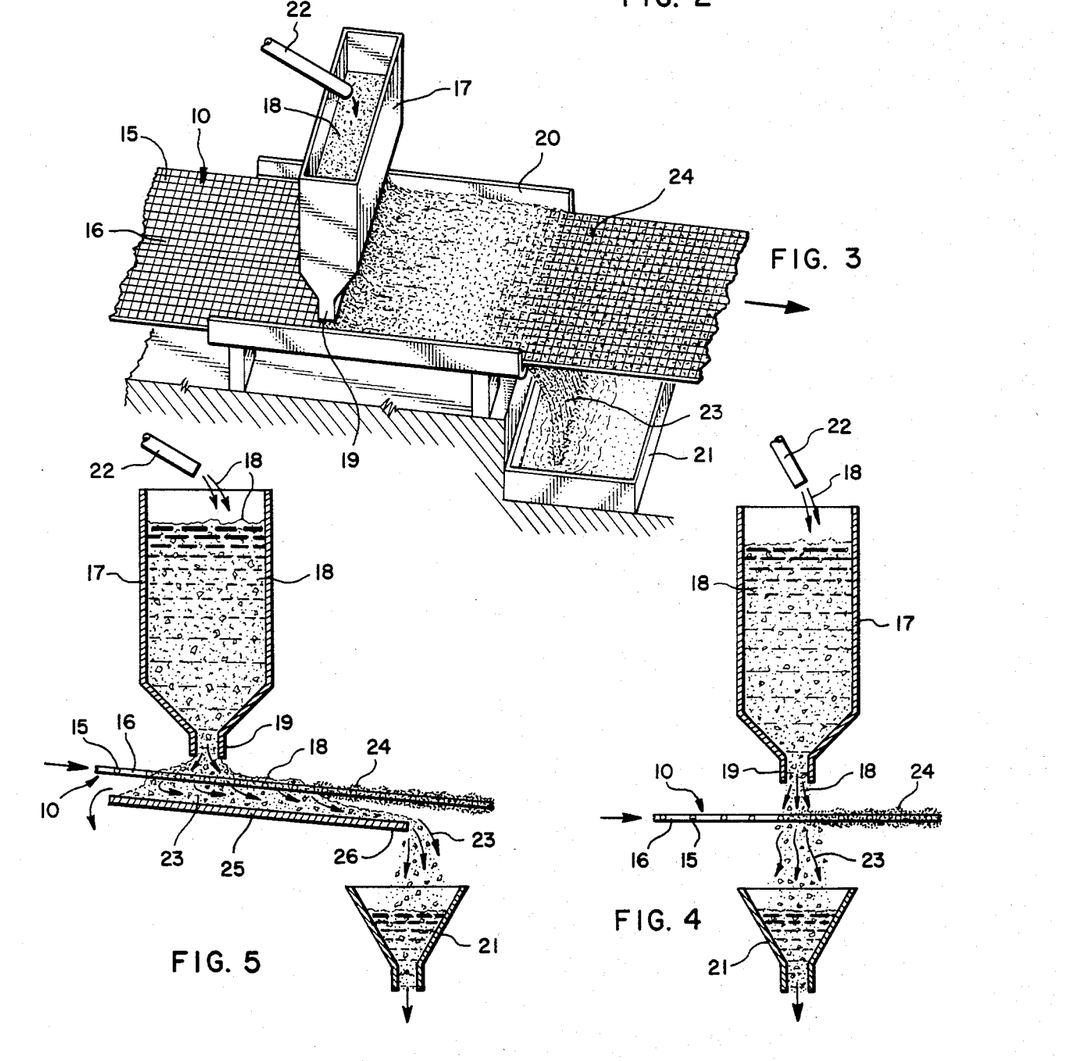
FIG. 3 is an enlarged perspective view of an embodiment of a separation zone of the apertured oleophilic belt conveyor.
FIG. 4 is a schematic illustration of one type of separation zone of the apertured oleophilic belt.
FIG. 5 is a schematic illustration of a second type of separation zone taken along lines 4—4 of FIG. 1 that uses a flat plate to spread the mixture flowing through the apertures of the belt and to encourage flow thereof along the belt.

Various specific methods of separation by the apertures oleophilic belt, broadly shown in FIG. 3, are illustrated in FIGS. 4, 5, 6, 7 and 8. The belt used for the separations may be a perforated flat belt made from a thin sheet of high tensile strength material that is oleophilic by nature or is covered with an oleophilic coating. More preferably this may be a mesh belt as shown in FIG. 2 of woven construction made from high tensile strength strands of material. The belt surfaces 15 may be covered with an oleophilic coating and/or the belt may be woven from a material that is strongly oleophilic. A mesh belt, woven from nomex (heat resistant nylon) string and berylium copper wire and then coated with neoprene cement and then vulcanized, has been used effectively during the experiments that have been conducted with this method of separation. Mesh belts may be made from various types of organic fibers of high tensile strength or from strong metal wires that will bond strongly with oleophilic coatings. Suitable coatings may include neoprene, urethane, polypropylene and other plastics and artificial oil resistant rubbers. A steel cable mesh belt as is, or preferably covered with an oil resistant, wear resistant coating of metal, plastic or artificial rubber may suitably be used.

A mesh belt 10 with square or rectangular apertures 16 is used preferably wherein each aperture 16 is enclosed by four oleophilic surfaces 15 formed by the mesh construction of the belt. Mean belt aperture size may range from 0.02 inch to 1.00 inch, most preferably 0.1 inch to 0.3 inch and may be optimized for the material of belt construction, consistent with the size of the slurry particles that need to pass through these apertures and consistent with effective recovery of oil phase from the belt in a subsequent recovery zone. Effective oil phase recovery from the belt becomes difficult when the mean belt aperture size is smaller than one-third of the average belt thickness, unless hot gas is used to remove oil phase from the belt as is discussed with FIG. 13. Large aperture/thickness ratios are preferred.

The preferred belt thickness is in the range 0.03 to 1.0 inches with the most preferred thickness between 0.05 and 0.25 inches.

The preferred belt width is determined by the desired throughput of mixture that needs to be separated and may be 30 feet or wider. However, satisfactory separation has been achieved with an experimental belt 11 inches wide.

The belt surface speed preferably is in the range 0.03 to 10.0 feet per second and most preferably 0.5 to 5.0 feet per second.

The preferred slurry thickness depends upon the type of slurry that is to be separated. Dilution with water should be such that oil phase particles have enough freedom to adhere to the oleophilic surfaces of the belt when coming in contact therewith. Generally any slurry that has been conditioned in a drum to a smooth free flowing slurry from which oversize particles have been removed is suitable for separation by the oleophilic apertured belt. Separation may often be improved however, by diluting such a slurry to provide additional mobility to the oil phase particles and to reduce as well erosion of bitumen from the belt surfaces by the aqueous phase passing through the belt apertures. This may be done by adding water to the slurry prior to separation or it may be accomplished by spraying water on to the belt in the separation zone to wash solids through the belt apertures. Both types of dilution may be practiced as well simultaneously. There appears to be no limit to the amount of dilution water that may be added to the slurry except that concerns of economics would seem to dictate that no more dilution should be used than what is required for effective separation.

The temperature is adjusted such that the viscosity of the bitumen or oil phase during separation provides for optimum adhesion of oil phase to the oleophilic surfaces of the belt; it preferably is in the range 1.0 to 10,000 poises and most preferably in the range 10 to 1,000 poises. For separating Alberta oil sand slurries, operating temperatures in the range of 100° to 140° F. usually provide for bitumen viscosities well within that range. For separating mixtures of lighter petroleum and water the operating temperatures may need to be much lower. Conversely, for separating oil sand slurries with a more viscous bitumen, as for example from the oil sands deposits near Vernal, Utah, the operating temperature may need to be higher i.e. 141°–212° F.

FIG. 3 generally illustrates a separation zone of the apertured oleophilic belt separator. A hopper 17 is provided to distribute the prepared slurry 18 evenly through an outlet 19 and onto the separation belt 10 which is passing through the confines of a trough where water and particulate solids pass through the belt apertures 16 and are collected in vessel 21 for disposal. Bitumen is captured by the oleophilic belt surfaces 15 and conveyed thereby to subsequent treatment zones and to recovery zones where the bitumen is removed for further processing.

Reference is made to the separation zone illustrated in FIG. 4. The mixture 18 to be separated may consist of a continuous oil phase, containing dispersed aqueous phase, it may be a bitumen froth or it may be a mixture of continuous water phase, with or without solids, that has previously been treated in a tumbler with oleophilic surfaces for the purpose of increasing the dispersed oil phase particle, such as described in the above mentioned U.S. Pat. Nos. 4,392,949 and 4,406,793. The mixture is conveyed by means of a pipe 22 to a hopper 17 with a bottom outlet 19 that deposits the mixture onto the belt 10. Other means of conveying such mixtures to the belt may be used instead and will be obvious to those skilled in the art. Proper design of the hopper outlet 19 or proper design of these other conveying means may serve to reduce the velocity of impact of the mixture with the belt 10. Aqueous phase 23 which may include particulate solids, and possibly some small oil phase particles may pass through the belt apertures 16 and is discarded, while the oil phase 24 that contact the oleophilic belt surfaces 15 is captured thereby and is carried thereby out of the separation zone. When the mixture consists of a continuous oil phase, the mixture is deposited onto the belt surface which then carries it out of the separation zone to a treatment zone where solids and/or water are removed from the oil phase on the belt. When the mixture consists of a continuous aqueous phase and enlarged dispersed oil phase, aqueous phase passes through the belt apertures and dispersed oil phase particles are captured by the oleophilic belt surface. The velocity of belt movement may be optimized for each mixture that is to be separated. Belt movement that is too slow causes filling up of the apertures 16 and results in blinding of the belt 10 by oil phase 24 and this restricts flow of aqueous phase 23 through the apertures 16. This may result in an oil phase product of higher solids contents than is desirable. Belt movement that is too fast to permit sufficient contact time for the oil phase to be captured by the oleophilic belt surfaces causes that an undesirable amount of oil phase is discarded with the water phase product. Flow of aqueous phase through the belt apertures 16 that is so fast that many oil phase particles do not have time to adequately contact the oleophilic belt surfaces similarly results in an undesirable loss of oil phase with the aqueous phase product.

The probability of capture of oil phase particles by the oleophilic belt 10 may be increased by reducing the velocity of movement of the belt relative to the oil phase particles and by increasing the number of times that the oil phase particles pass by an oleophilic surface 15. FIGS. 5, 6, 7 and 8 illustrate various methods whereby this may be accomplished. This applies to mixtures with oil phase particles that have been enlarged by pre-treatment but this also applies to mixtures that have not been pre-treated in this manner. When using one of these methods the belt may be temporarily immersed in an aqueous phase in the separation zone.

In FIG. 5 a stationary flat plate 25 is mounted under the apertured belt 10 to spread out the flow of mixture from the hopper 17 over a larger area of the belt 10 and to permit the slurry mixture 18 to flow for a distance along the belt 10 and provide opportunity for the dispersed oil phase particles 24 of this mixture 18 to pass by a multitude of oleophilic belt surfaces 15 and increase thereby the probability of their capture by the belt. Coarse particulate solids, on the other hand, readily settle in the slurry mixture 18, pass through the belt apertures 16, deposit on top of the plate 25, are dragged along the top surface of the plate 25 by the mixture moving with the belt 10, and fall over the edge 26 of the plate 25.

The preferred width of the stationary flat plate 25 or any other surface under the belt is slightly more than the width of the belt 10 and the preferred length of the flat plate or other surface is between 10 and 1000 mean aperture lengths along the belt 10. The distance between the flat plate 25 and the apertured belt 10 is adjusted to provide for optimum operation with the slurry mixture 18 that is being separated. When particulate solid particles are in the aqueous phase passing through the belt apertures it may be advantageous to insure that the distance between said surface and the apertured belt at all times is great enough to prevent simultaneous contact of a solid particle of the aqueous phase by both the belt and said surface; i.e. said minimum distance should be in excess of the solids particle size of the aqueous phase. Distances less than that may result in excessive belt and surface wear and may cause erosion of oil phase from the belt. Said minimum distance may be increased beyond that to permit deposition of a layer of particulate solids on said surface which is thereafter maintained approximately constant by the erosion forces of the velocity components in the water layer under the belt and above said layer. When no particulate solids are present in the aqueous phase said surface under the belt may be in contact with the belt or there may be a small distance between the belt and said surface to prevent excessive wear of the belt and/or the surface or transfer of oil phase from the belt to said surface. Said minimum distances may vary from 0.01 inch to 1.0 inch or more, depending upon the type of belt and flat plate used and the mixture to be separated and would normally be determined empirically for each system. The maximum distance between the belt and said surface may be much greater; i.e. 0.1 to 10 inch, depending upon the mixture to be separated and the type of belt and surface used. Said surface normally would be oleophobic to prevent accumulation of oil phase thereon unless means are provided to remove and recover such accumulated oil phase from said surface or transfer it to the belt. However as explained, a layer of particulate solids that have passed through the belt apertures may accumulate on top of said surface. This layer may provide an oleophobic interface suitable to prevent accumulation of oil phase thereon. The surface under the belt and its position relative to the belt may be configured to encourage passage of particulate solids through the belt once and as few times as possible thereafter and to encourage their disposal from said surface; and to encourage passage of dispersed oil phase through the belt apertures several times. For example said surface may be in the form of a washboard whereof its corrugations are designed such as to encourage wavelike mixture flow that passes up and down through the belt apertures a multiplicity of times as it flows in the direction of the belt movement toward the edge of said surface or plate.

Dispersed phase may contact oleophilic belt surfaces because of the difference between the velocity of the belt surfaces and the velocity of the aqueous phase. This velocity of the aqueous phase is essentially zero at the hopper exit. Except for components of swirl or turbulent flow, this velocity of the aqueous flow is essentially equal to the velocity of the apertured belt at the apertured belt. This velocity of the aqueous flow is again essentially zero at the surface under the apertured belt; unless this surface is moving and then the flow near the surface is essentially equal with the velocity of movement of said surface under said apertured belt. Alternately dispersed phase may contact oleophilic belt surfaces by passing through the belt apertures more than one time; and the greater number of times that said dispersed phase passes through said apertures the greater the probability that dispersed phase contacts oleophilic belt surfaces surrounding said apertures and becomes captured thereby.

A short non-apertured conveyor belt (not shown), that revolves in the same or opposite direction may be mounted under the apertured belt instead of the flat plate 25 to similarly increase the number of times that dispersed oil phase particles pass by oleophilic surfaces 15 of the apertured belt 10. The use of such a conveyor belt under the apertured belt provides for convenient solids removal. Alter solids have passed through the belt apertures the conveyor under the apertured belt conveys the solids which then drop away from the apertured belt after the solids reach the end roll of the conveyor under the apertured belt. The surface speeds of both belts may be the same or they may differ so as to provide some relative movement between the apertured belt surfaces and the dispersed phase particles of the mixture being separated. The surface of said non apertured conveyor belt may be oleophobic or it may be olephilic and it may make contact with the apertured belt at a location along said apertured belt for the purpose of transferring adhering oil phase to said apertured belt and/or a scraper may be used to remove adhering oil phase from said non apertured belt. Alternately said non apertured belt may contact said apertured belt at a location along said apertured belt for the purpose of transferring oil phase from the apertured belt to the non-apertured belt from where it may be recovered by means of a doctor blade.

Figure 6:
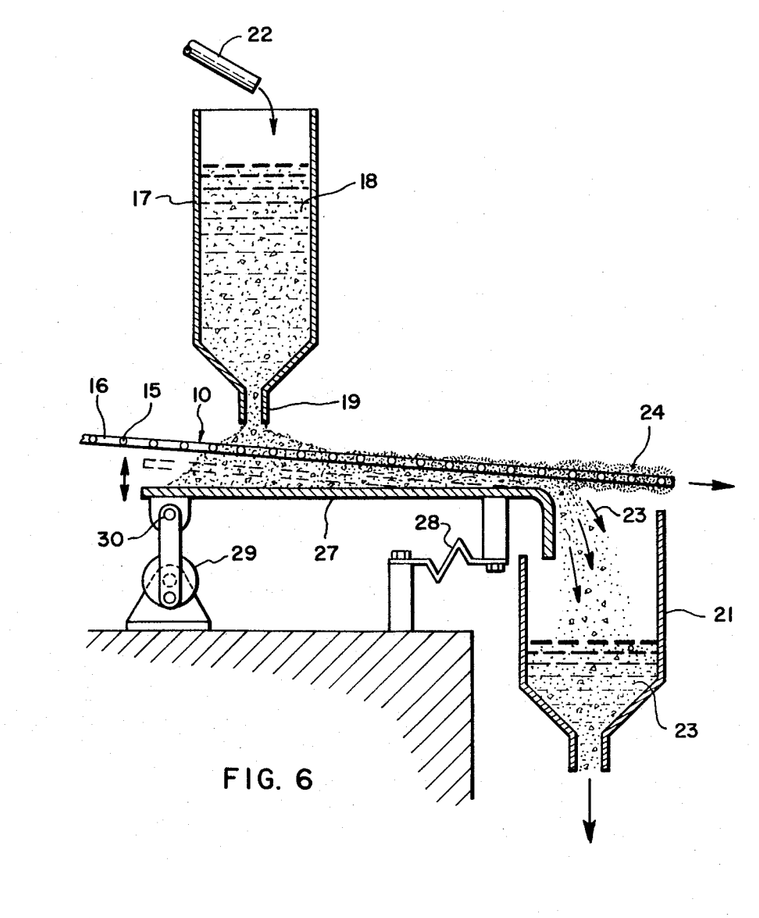
FIG. 6 is a schematic illustration of a third type of separation zone taken along lines 4—4 of FIG. 1 that uses an oscillating flat plate under the apertured belt whereon the amplitude of oscillation decreases in the direction of belt movement.
Figure 7:
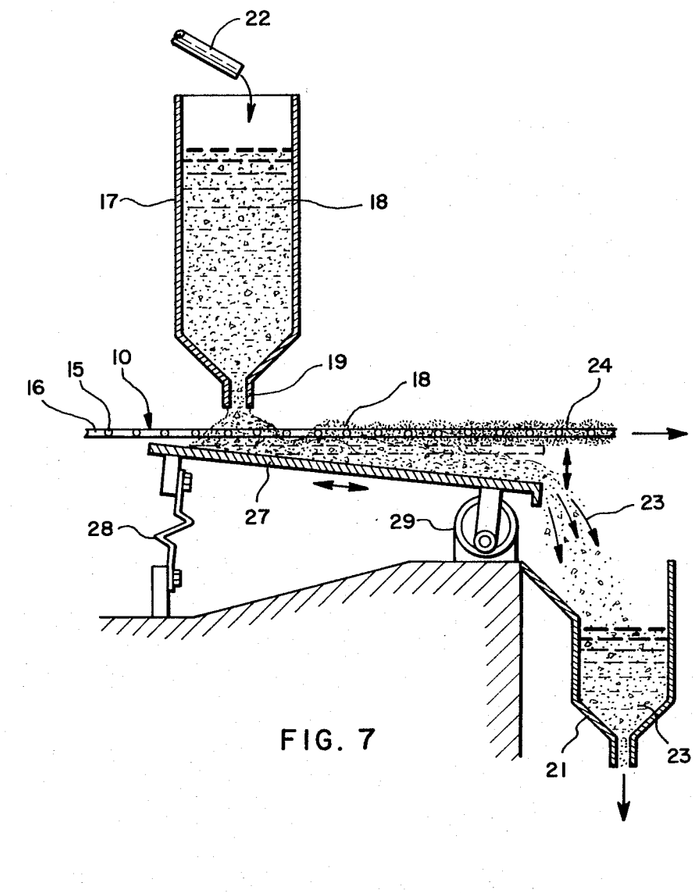
FIG. 7 is a schematic illustration of a fourth type of separation zone taken along lines 4—4 of FIG. 1 that uses an oscillating flat plate under the apertured belt whereon the amplitude of oscillation increases in the direction of belt movement.

The concept of a surface under the apertured belt, for the purpose of increasing the number of times that dispersed phase oil particles pass by oleophilic belt surfaces, may be extended by using an oscillating flat plate. The flat plate 25 may oscillate uniformly up and down with approximately the same aplitude of oscillation over the whole plate surface, or the amplitude may be made to vary over the plate as shown in FIGS. 6 and 7. FIG. 6 illustrates an up and down oscillating flat plate 27 whereon the amplitude of oscillation decreases along the plate in the direction of movement of the apertured belt. FIG. 7 illustrates an up and down oscillating flat plate 27 whereon the amplitude of oscillation increases along the plate in the direction of movement of the apertured belt.

Oscillatory movement may be imparted to the plates 25 or 27 by an eccentrically rotating shaft, by revolving weights, by an electromechanical device, by a sonic or ultrasonic or any other type of generator and with any device and linkage or hook-up familiar to those skilled in the art. Up and down oscillatory movement may be imparted to the apertured belt, as well or instead, for the same purpose. However, almost invariably the apertured belt 10 will be set in oscillation, when the plates 25 and 27 are oscillated up and down, as a natural consequence of the forces in the mixture 18 under separation that are in contact with both the belt 10 and the oscillating plates 25 or 27. The response wave form and amplitude of such forced oscillation imposed upon said apertured belt may be dependent upon the frequency of said oscillating surface, upon the natural frequency of said belt and upon the amount of damping imposed upon said belt by the apparatus supporting and/or contacting said belt. Consequently, the response movement of said belt to the imposed oscillation may be such that at any point in time the belt may move up or down in direction with the surface or may move up or down in direction opposite to the movement of said surface. Solids in the aqueous phase passing through the belt apertures may also have some influence upon the amplitude, frequency and position of the oscillating belt.

In FIGS. 6 and 7 the flat plate 27 is moveably supported at one end by a means 28 such as a pivot or a leaf or coil spring that provides for a slight angular movement to the plate 27 but that is rigid enough to prevent the plate 27 from wobbling excessively. A bearing on a rotating eccentric shaft 29 directly connected or linked through a pivot 30 to the flat plate 27 imparts oscillatory motion to the plate 27.

In FIG. 6 the amplitude of oscillation decreases in the direction of belt movement. The belt may be horizontal or may decline in the direction of belt movement, which in the Figure is from left to right. Sides 20 may be provided on the plate to prevent loss of mixture along the belt edges and streams of water may be provided near the belt edges to keep the dispersed oil phase away from the belt edges. The liquid level of the mixture under separation passes through the apertured belt about two times with every revolution of the eccentric shaft over part of the flat plate. Near the left or rear edge of the plate there may be rapid movement of the liquid level passing through the belt, and fast liquid flow past the oleophilic belt surfaces, but, due to the varying amplitude of oscillation, this velocity of movement progressively becomes smaller in the direction of belt movement. This progressive change in the relative movement between the oleophilic belt surfaces and the mixture is conductive to capture of dispersed oil phase of the mixture by the oleophilic belt surfaces 15.

With reference to FIG. 7, the pivot 28 and the eccentric 29 are located such that the amplitude of oscillation increases in the direction of belt 10 movement. Moreover, with the eccentric directly attached to plate 27 the oscillation is both forward and backward as well as up and down. In some cases this type of plate motion is conductive to successful movement of coarse grained particulate solids along the plate in the direction of belt movement. In this embodiment the rate of liquid flow through the belt apertures 16 and past the surfaces 15 of the belt gradually increases in the direction of belt 10 movement and this is effective for capture of dispersed oil phase particles from the mixture 18 provided that the oscillatory movement of the plate 27 is gently enough so as not to erode captured oil phase from the belt surfaces 15.

Of course it would also be possible to place the pivot point of the flat plate nearer the middle of the plate. In that case the amplitude of plate oscillation would initially decrease in the direction of belt movement, up to the pivot point, and then would increase in the direction of belt movement thereafter. Such decrease or subsequent increase in amplitude of oscillation in the direction of belt movement occurs whenever the pivot point is placed between the front and rear plate edges.

The positions of the pivot 28 and the linkage of the eccentric 29 on the plate 27 with respect to the direction of belt 10 movement will normally be determined empirically for the mixture that is under separation. The degree of belt decline, the angle of tilt of the plate 27 and its amplitude and frequency of oscillation may be adjusted empirically for the mixture under separation as well. Normally these are adjusted empirically for each system so as to encourage the dispersed oil phase in the mixture to pass as many belt surfaces as possible in such a way as to encourage as much as possible of the oil phase to be captured by the belt 10. The coarse solids, however, after having passed through the apertures 16 once, are encouraged to pass through the apertures 16 as few times as possible thereafter. The difference in settling rate between dispersed oil phase particles and coarse sand grains in an oil sand slurry provides for convenient optimization of the separation process through these adjustement when separating an oil sand slurry. Generally the frequency of oscillation will be between 1.0 and 1000 Hz but may be outside these limits. The amplitude of oscillation generally will be between 0.01 and 4.0 inches but may be outside these limits. Both sets of limits may depend upon the type and size of apparatus used and the sizes of the dispersed oil phase particles and particular solids of the mixture under separation. Oscillatory movement may also be imparted to the belt or to the flat plate in the direction of the width of the belt for the purpose of imparting additional relative movement between the oleophilic belt surfaces and the dispersed phase particles in the mixture 18, so as to increase the rate of oil phase capture by the belt 10. Minimum and maximum mean distances between oscillating plates and the apertured belt will normally fall in the ranges described for stationary flat plates.

Figure 8:
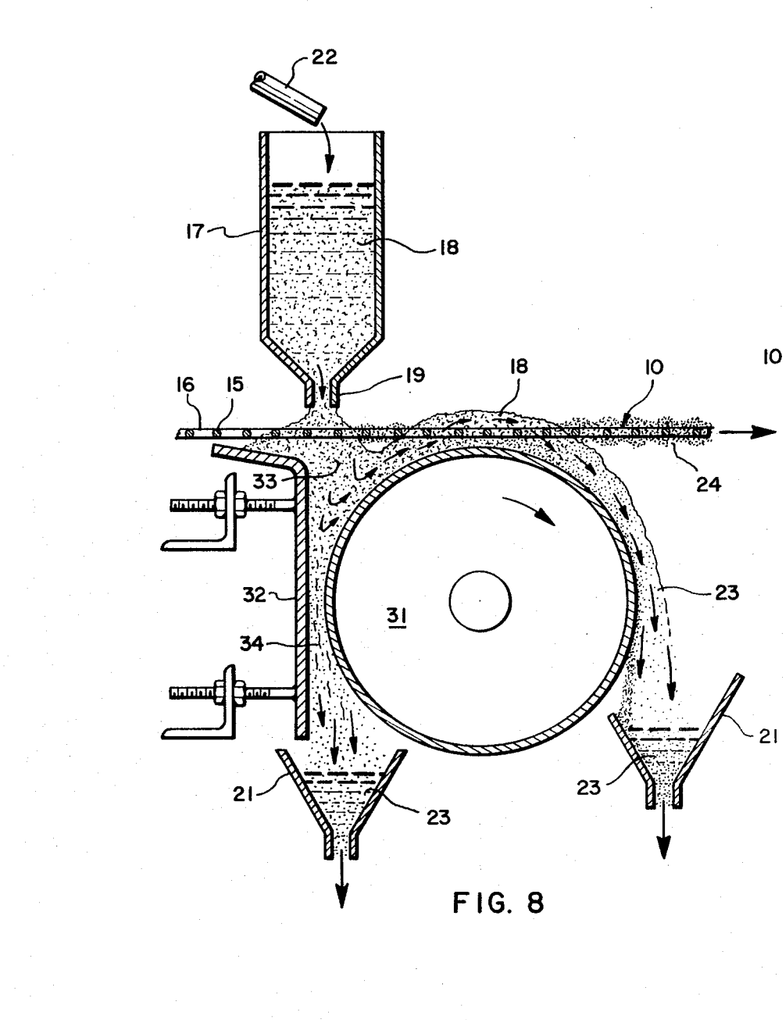
FIG. 8 is a schematic illustration of a fifth type of separation zone taken along lines 4—4 of FIG. 1 that uses a baffle plate and a rotating roller to remove solids from the slurry and to cause part of the slurry to pass through the belt apertures more than one time.

The concept of a floor under the apertured oleophilic belt 10 in a separation zone is further extended in FIG. 8 where the surface takes the form of a roller 31 that rotates in the direction of belt 10 movement. A baffle 32 is mounted beside the roller to provide an enclosed area 33 under the belt in which slurry dilution may take place. Coarse particulate solids, that readily settle in the slurry, pass through the cavity 34 between the baffle 32 and the roller 31 surfaces while remaining water and dispersed oil phase are carried over the top of the roller 31, past oleophilic belt surfaces 15 for the second time, and down the roller 31, past oleophilic belt surfaces 15 for the third time, prior to being discarded. Up and down and/or sideways oscillatory movement may be imparted to the roller 31 for the purpose of encouraging capture of oil phase particles by the oleophilic belt surfaces. Stationary baffles or rotating disc type ends on the roller 31 may be provided near the belt edges to prevent slurry 18 from spilling out of the enclosed area 33 in large quantity near the ends of the roller 31.

In summary, in the separation zones, a mixture of oil phase and aqueous phase is deposited on to a moving apertured oleophilic belt. A floor may be provided under the belt that spreads the mixture and enhances capture of oil phase particles from said mixture by the belt. This floor may move in direction with the belt, it may be stationary or it may move in direction opposite with the belt, it may oscillate up and down and/or it may oscillate sideways, all for the purpose of enhancing capture of dispersed oil phase by the oleophilic belt and for discarding oil phase depleted aqueous phase away from the belt.

TREATMENT

Oil phase captured by the apertured oleophilic endless belt in a separation zone (I) may be recovered from the belt in a recovery zone (III) for subsequent processing. For example, the bitumen may be diluted with naptha before or after removal from the belt and then may be centrifuged and refined according to the conventional process disclosed in Canadian Pat. No. 952,842 issued on Aug. 13, 1974 to Robert A. Baillie et. al. Alternately, undiluted bitumen, after removal from the belt, may be refined by a process called "Direct Coking". As explained by Donald L. Flock et. al. in the July-September 1975 Montreal issue of "Technology", "Direct Coking" involves a fluidized bed technique that has been tested by the Canadian Federal Department of Mines and Technical Surveys. In this process bitumen or oil sand feed is introduced into a coker or still and is heated to approximately 900° F. by contact with a fluidized bed of clean sand. Volatile portions of the feed are distilled off and residual portions ae thermally cracked which results in the deposition of a layer of coke around each sand grain. The coke-coated solids are transferred to a burner where coke is burned off the sand grains. The clean sand is reinjected into the coker. The volatiles may be refined thereafter in several stages to produce hydrocarbon fuel. Generally, bitumen produced by the present invention readily lends itself to upgrading by coking processes.

However, the bitumen leaving a separation zone of the present invention is in the form of a thin coating on the surfaces of the belt, and this form is convenient for localized treatment that may be concentrated and focused on the bitumen before it is removed from the belt for subsequent processing. Trapped siliceous minerals, heavy minerals, and other minerals may be removed from this bitumen in sequential treatment zones (II) along the belt. In such zones an aqueous reagent, that has affinity for the mineral that is to be removed from the bitumen, is admixed with the bitumen on the belt and then it is removed therefrom, carrying with it some of this mineral. Deaeration and dewatering of the bitumen on the belt may be done in conjunction with, separately from, or instead of such mineral removal. In addition, the bitumen on the belt in other treatment zones may be exposed to cold, heat, infrared rays, microwave radiation, radioactive radiation, reactive gasses, or hydrocarbon solvents or to any other such influences as may desirably alter the physical or chemical properties of the bitumen on the belt. Chemicals in liquid form, solution form, or in powder or granular form may be admixed with the bitumen while on the belt or in a subsequent reaction after the bitumen has been removed from the belt.

Figures 9, 10:
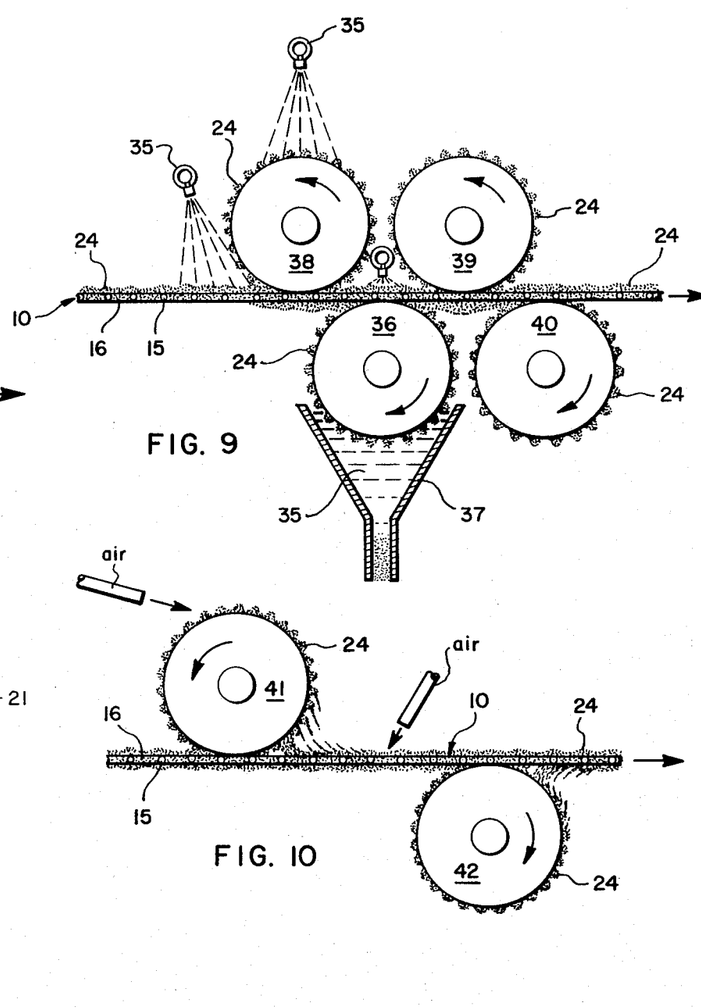
FIG. 9 is a schematic illustration of a treatment zone taken along lines 5—5 of FIG. 1 showing rollers that contact the top and bottom surfaces of the apertured oleophilic belt, and showing methods whereby reagents may be added to the bitumen on the belt or on the rollers.
FIG. 10 is a schematic illustration of a different treatment zone taken along lines 5—5 of FIG. 1 showing two rollers that are lightly in contact with the belt surface for the purpose of rupturing bitumen to expose hydrophilic droplets or particles that are trapped by the bitumen.

Exemplary methods of bitumen processing in a treatment zone are illustrated in FIGS. 9 and 10. With reference to FIG. 9, reagent 35 may flood or be sprayed onto the belt 10. Alternately, one or more rollers 36 in contact with the bitumen on the belt 10 may be immersed in a bath 37 of reagent. Or, if desired, reagent 36 may be sprayed onto one or more rollers 38. In any event, the belt is subjected to an aqueous reagent environment without necessarily becoming immersed in the reagent. After reagent covers the outside surface of the bitumen 24 on the belt or on a roller 38, admixing of reagent with bitumen may be accomplished with two or more hydrophilic or oleophilic rollers 38, 36, 39 and 40 that are mounted alternately above and below the belt 10 and that press against the bitumen on the belt surface. Using such alternating rollers at sufficient pressure against the belt 10 causes a back and forth transfer of bitumen through the apertures 16 of the belt 10 during which the reagent mixes with the bitumen it covers. The excess reagent falls away from the belt, carrying with it mineral particles that became exposed during the admixing of reagent with the bitumen.

Hydrophilic surface active transfer agents, such as polyphosphates, may be admixed with the bitumen on the belt and subsequently removed therefrom, in the manner described in the preceeding paragraphs, for the purpose of removing trapped siliceous particulate solids from the bitumen of the belt. Any water soluble salt of pyrophosphoric acid, $H_2P_2O_7$, such as for example tetrasodium pryophosphate or sodium tripolyphsophate may be added to the bitumen in proportion of 0.01 percent to 1.0 percent for that purpose. Addition of sodium hydroxide with said polyphosphate reagent in about equal proportions appears to aid in the removal of said solids from the bitumen.

In instances where the oil phase may contain heavy minerals, for example, bitumen may contain as high as 1.0 to 10.0 percent of heavy minerals as for example zircon, rutile, ilmenite, tourmaline, apatite, staurolite, garnet, etc., it may be desirable to employ chelating agents to make these particulate heavy minerals water-wet, cause them to report to the water phase, and be removed therewith from the bitumen. Examples of suitable chelating agent are ethylenediamine-tetraacetic acid, sodium gluconate, gluconic acid, sodium oxalate and diethylene glycol.

Aqueous solutions of non-ionic surface active compounds, as for example a chemical demulsifier comprising polyethoxyalkene compound sold under the trade name of NALCO D-1645 produced by the Nalco Chemical Company, may be admixed with the bitumen on the belt for the purpose of removing trapped water phase from the bitumen of the belt. Another demulsifier that may be used for removing trapped water is sold under the trade name of BREAXIT 7941 and comprising a mixture of: (1) One part of the reaction product of diethyl ethanolamine with premixed propylene oxide and ethylene oxide; and (2) approximately three parts of a palmitic acid ester of the reaction product of an alkyl phenol formaldehyde resin with ethylene oxide. Other demulsifiers that may be admixed with the bitumen on the belt for the purpose of improving bitumen dewatering in the present invention are polyoxypropylene glycols produced by the Wyandotte Chemical Company under the tradename "PLURONIC".

With reference to FIG. 10, removal of dispersed aqueous phase and solids out of the bitumen 24 on the belt 10 may be enhanced by the use of one or more oleophilic rollers 41, 42 that lightly contact the bitumen 24 on the belt 10. Without intending to limit the scope of the present invention in any way, the process of removal of dispersed aqueous phase by these oleophilic rollers lightly in contact with bitumen on an apertured oleophilic belt may be thought of as a bitumen rupturing process with preferred cleavage through the dispersed phase. In theory an oleophilic roller that contacts an oleophilic, bitumen covered, moving belt will collect on its surface a layer of bitumen. With the belt of FIG. 10 moving from left to right, this bitumen layer 24 on the rotating roller 41 contacts and joins the layer 24 of bitumen that is on the moving belt 10 just left of the vertical center line of the roller. The bitumen 24 on the roller and the bitumen 24 on the belt 10, as it moves, remain united for some small distance to the right past this center line. Thereafter the bitumen ruptures the part of it 24 is carried upward by the roller and part of the ruptured bitumen 24 is carried to the right by the belt. Aqueous particles or droplets that are part of this bitumen prior to rupture, weaken the self adhesion of the bitumen locally thereby causing rupture of the bitumen through these aqueous droplets. As a consequence, the film rupturing process exposes aqueous phase particles and droplets which may subsequently be washed or blown from the bitumen surfaces of rollers 41 and 42 and the belt 10 by means of air jets. Aqueous phase droplets may also be removed from an oleophilic belt 10 or rollers 41 and 42 and bitumen surfaces 24 by means of a hydrophilic roller (not shown) that lightly touches such oleophilic surface 24 or by any other appropriate means.

The temperature of treatment zones may be adjusted such that the viscosity of the oil phase during treatment provides for optimum conditions for each treatment step. However considerations of economics may dictate that this temperature does not vary significantly from the desired optimum temperature of the preceding separation zone. In any event the viscosity of the oil phase being treated should be high enough so as to prevent excessive loss of oil phase in the treatment zone or zones by dripping or with the aqueous affluents therefrom. The oil phase viscosity preferably is in the range 1.0 to 10,000 poises and most preferably in the range of 10 to 1000 poises.

Thus, in the treatment zones, bitumen on the belt is admixed with reagents that (1) encourage removal of solids and water from said bitumen, (2) aid in recovering minerals from the bitumen &/or (3) help to process the bitumen into a purer product prior to removal from the belt. In the treatment zones bitumen on the belt may be exposed to reactive chemicals or to radioactive radiation for the purpose of changing the chemical properties of bitumen. Admixture with a petroleum solvent, such as naptha, or exposure to energy fields, such as infrared radiation or microwave rays, may be used to reduce the viscosity of the bitumen and thereby to facilitate removal of bitumen from the belt in subsequent recovery zones. Also the bitumen may be ruptured to expose aqueous particles which may be removed by blowing or contact with hydrophilic surfaces.

RECOVERY

Figures 11, 12, 13:
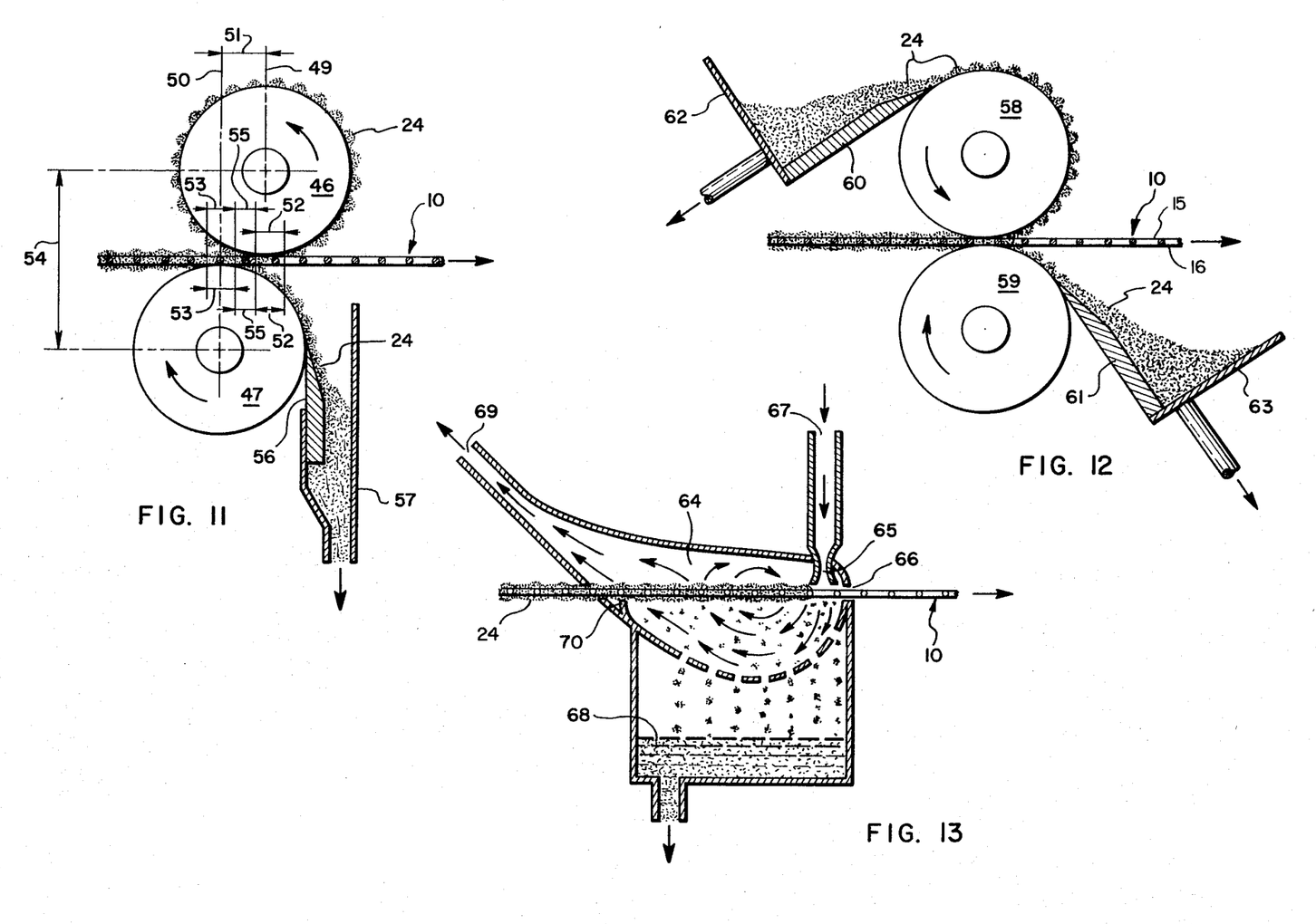
FIG. 11 is a schematic illustration of a recovery zone taken along lines 6—6 of FIG. 1 showing a method for removing oil phase from the apertured oleophilic belt by the use of a transfer roller and a recovery roller.
FIG. 12 is a schematic illustration of a recovery zone taken along lines 6—6 of FIG. 1 showing a method for removing oil phase from the apertured oleophilic belt by the use of two recovery rollers.
FIG. 13 is a schematic illustration of a recovery zone taken along lines 6—6 of FIG. 1 showing a method for removing oil phase from the apertured oleophilic belt by means of a concentrated stream of hot gas that erodes preheated oil phase from the belt.

Oil phase carried by the apertured oleophilic endless belt 10 into recovery zones (III) may there be removed from the belt in a variety of ways. FIG. 11 illustrates a bitumen transfer and recovery method that makes use of a transfer roller 46 and a recovery roller 47 to remove bitumen 24 from said belt. The transfer roller 46, which is used to transfer or extrude bitumen through the belt apertures 16 onto the recovery roller 47, is mounted in contact with the belt 10 on one side thereof while the recovery roller 47 is mounted in contact with the belt 10 on the opposite side. Assuming, for purposes of descriptions, that the belt is horizontal, a vertical line 49 drawn through the center of the transfer roller 46 is slightly further along the belt 10 in the direction of belt movement than a vertical line 50 drawn through the center of the recovery roller 47. This is done to provide a horizontal distance 51 of offset between the rollers 46 and 47. The actual distance between the area of contact 52 that the transfer roller 46 makes with the belt 10 and the area of contact 53 that the recovery roller 47 makes with the belt 10 may be adjusted for a given small horizontal offset distance 51 by making an adjustment to the vertical distance 54 between these rollers 46 and 47. After both rollers are in contact with the bitumen on the belt, any decrease in this vertical distance 54 between the centers of the rollers 46 and 47 causes tension and deformation of the belt and reduces said distance between the areas of contact. For optimum operation, the transfer roller 46 should apply pressure to the belt 10 and there should be said small distance 55 along the belt between the two rollers 46 and 47 where the belt 10 does not touch either roller surface. This small distance 55 provides a channel for extrusion flow of bitumen by the transfer roller 46 through the belt apertures 16 onto the recovery roller 47. Said small distance 55 may be adjusted empirically to give optimum bitumen recovery at the bitumen properties and operating conditions existing in the recovery zone (III). Bitumen 24 covering the surface of the recovery roller 47 may be removed by means of a doctor blade 56 into a hopper 57 from where it is removed for subsequent processing.

Another means for recovering bitumen from the belt is illustrated in FIG. 11 of Ser. No. 037,896 filed May 10, 1979 and now issued as U.S. Pat. No. 4,224,138. This removal means may be suitable for recovery in both gaseous and aqueous atmospheres.

An alternate recovery method involves the use of two recovery rollers 58 and 59 mounted on opposite sides of the belt 10, as illustrated in FIG. 12. The rollers may be mounted directly opposite each other, as is illustrated, or there may be a distance 51 of offset between them as shown in FIG. 11. Sufficient pressure is applied to the belt 10 by each recovery roller 58 and 59 to permit the surface of each recovery roller to pull bitumen 24 out of the belt apertures 16. Operation of these recovery roller 58 and 59 is such that the top roller 58 removes bitumen from the top of the belt 10 and carries with it about half of the bitumen removed out of each aperture 16, while the bottom roller 59 removes bitumen from the bottom of the belt 10 and also carries with it about half of the bitumen removed out of each aperture 16. The surfaces 15 of the belt 10 leaving these recovery rollers 58 and 59 are coated with a film of residual bitumen but most of the excess bitumen has been removed by said rollers and the belt apertures 16 are open, ready for use again to capture bitumen in a subsequent separation zone. A doctor blade 60 may be used on the top roller 58 and a doctor blade 61 may be used on the bottom roller 59 to remove bitumen from the surface of the recovery rollers into hoppers 62 and 63 from where it is removed for subsequent processing.

The recovery methods of FIGS. 11 and 12 may be used for recovering bitumen from the belt without prior dilution and at about the temperature that exists in the preceeding separation zone. Alternately, bitumen recovery from the belt with rollers may be enhanced by reducing the bitumen viscosity on the belt prior to recovery. The bitumen viscosity may be reduced in a prior treatment zone for this purpose by heating the bitumen on the belt or by diluting said bitumen with a solvent such as naptha. When rollers are used to remove bitumen from an apertured oleophilic belt, the belt generally should not be thicker than three mean belt aperture widths.

Methods other than rollers, for recovering bitumen from the belt in a recovery zone may be used as well. These methods generally involve reducing the bitumen viscosity on the belt and then permitting the bitumen to drop off or be blown off the belt. Hot gas may be blown through the belt to remove bitumen from the belt surfaces and out of the apertures. The use of hot gas in this manner normally provides for some dehydration of the bitumen as it is being recovered.

A method for blowing oil phase off the belt in a recovery zone in this manner is illustrated in FIG. 13. The bitumen loaded belt 10 passes through a turbulence chamber 64 where it is preheated. A nozzle chanel 65, of about the same width as the belt 10 and mounted near the belt exit 66 of said chamber 64 is fed by a channel 67 with a stream of hot gas that blows the preheated bitumen off the belt 10 into the bottom of said chamber 64, from where it is removed into a collection vessel 68. After passing through the belt 10 the hot gas serves as a source of heat for said chamber 64 and then is removed therefrom via a channel 69. A deflector plate 70 is provided in chamber 64 to prevent the hot gas stream from traversing the length of belt 10 and lowering bitumen viscosity such that it is removed from the belt prior to entering chamber 64. This hot gas, which may contain moisture that it has packed up from the bitumen in said chamber, may be vented or it may be reheated and repressurized for reuse after removal of the moisture.

The employment of such hot gas for removing oil phase from the belt will permit the use of thick belts with small apertures. However, safety precautions will normally be required to prevent overheating of the belt when the amount of oil phase on the belt is insufficient to maintain a desired low operating temperature of the belt to prevent damage to the belt unless apertured oleophilic belts are provided that are sufficiently heat resistant.

Oil phase viscosity in a recovery zone may be reduced instead by admixing with an oil-based solvent.

The temperature of recovery zones may be adjusted such that the viscosity of the oil phase is optimum for removal of oil phase from the belt and generally the lower the viscosity the better, provided that the oil does not drip off the belt prior to recovery, and consistent with considerations of economics and practical engineering. When rollers are used to recover the oil phase, the preferred oil phase viscosity is in the range of 0.1 to 10,000 poises and most preferably in the range of 1.0 to 10,000 poises. When jets of hot gas are used for the oil phase recovery, the desired hot gas temperature may be such as to provide for a local oil phase viscosity in the turbulence chamber within the range 0.001 to 100 poises. However, it is not the intent to limit the present invention to any particular viscosity range only.

In summary, in the recovery zones (III) oil or bitumen is removed from the belt for further processing and refining into synthetic crude oil, petroleum or related products. The apertured belt depleted of oil or bitumen (or from which at least part of the oil or bitumen has been removed) then passes to the subsequent separation zones, having belt apertures that are open and ready for passage of aqueous phase therethrough; and having belt surface that are strongly oleophilic and ready for capture of oil phase thereon.

The following examples are illustrative of various embodiments of the invention but are not to be construed as limitations thereof.

EXAMPLE I

A water-in-oil suspension, produced from partial in-situ combustion of oil sand is processed on an apertured oleophilic belt for the purpose of removing water therefrom. One half ton per hour of such suspension, at 145° F. containing 80.3 percent oil, 17.6 percent water and 2.1 percent particulate solids is deposited on to the apertured oleophilic belt of FIG. 4 through a hopper. The apertured belt 24 inches wide, made from polypropylene, 0.05 inch thick and with 0.2 inch mesh apertures carries the suspension at a velocity of 0.2 feet per second into a treatment zone such as illustrated in FIG. 9 where a roller, immersed in an aqeuous demulsifier solution of 2.0 percent NALCO D-1645, produced by the Nalco Chemical Company, is in contact with the belt for the purpose of adding this chemical to the suspension. A subsequent second and third roller extrude the bitumen first down and then up through the belt after which two rollers, mounted on opposite sides of the belt lightly contact the bitumen of both sides of the belt and rupture the bitumen of the belt to expose trapped water phase particles which are blown off the bitumen by means of warm air jets. Bitumen is recovered from the belt by means of two recovery rollers mounted on opposite sides of the belt and it analyses 95.7 percent oil, 3.3 percent water and 1.0 percent particulate solids. The belt conveyor is level and is enclosed in a housing that maintains the separation, treatment and recovery zones at approximately 140° F.

EXAMPLE II

A combined bitumen froth produced by a hot water oil sands extraction method is processed on an apertured oleophilic belt for the purpose of removing water and particulate solids therefrom. One half ton per hour of such froth, containing approximately 52.5 percent oil, 6.4 percent particulate solids, 41.0 percent water by weight, and containing approximately 30 volume percent air is conveyed to the hopper of a separation zone of an apertured oleophilic belt separator as is illustrated in FIG. 4. The belt is 24 inches wide and 1.0 inch thick. It is fabricated by twisting and weaving 0.01 inch diameter steel wires to form a cable mesh belt with 0.2 inch apertures and is then covered with a coat of neoprene cement and vulcanized. Four hundred pounds per hour of an aqueous reagent containing 2.0 percent sodium tripolyphosphate, 3.0 percent sodium oxalate and 1.0 percent BREAXIT 7941 demulsifier are sprayed onto the bitumen on the belt and are admixed therewith by means of four rollers mounted along the belt top and bottom surfaces such as to cause extrusion of bitumen down through the belt, up through the belt, down through the belt and up through the belt in succession. Aqueous phase that falls away from the belt is caught by a trough under the belt. This aqueous phase is found to contain particulate solds. Oil phase is removed from the belt by means of an apparatus illustrated in FIG. 13. Superheated steam at 300° F. is conducted to the nozzle where it is blown through the belt to cause preheated bitumen to be eroded from the oleophilic belt and drop to the bottom of the turbulence chamber from where it flows in a container for subsequent removal. The steam from the nozzle, after passing through the belt apertures then passes through the turbulence chamber where it preheats the bitumen on the belt in the turbulence chamber and then the steam is exhausted from said chamber. The bitumen product recovered from the container of the recovery zone analyzes approximately 96.9 percent oil, 2.0 percent particulate solids and 4.1 percent water and no air. A sample of bitumen taken from the belt preceding the recovery zone contains essentially no air.

EXAMPLE 3

One ton per hour of an oil-in-water emulsion produced by steam injection for the purpose of recovering bitumen from an oil sand formation is mixed with five pounds per hour of calcium sulphate for the purpose of breaking the emulsion and then is conveyed to the hopper of a separation zone, using a stationary flat plate as illustrated in FIG. 3. The 24 inch wide, 0.05 thick neoprene coated Nomex nylon mesh belt with 0.15 inch apertures is inclined in the direction of belt movement at a slope of 0.5 inch per foot and a glass plate is mounted directly under the belt with its top surface parallel with the belt and 0.03 inch removed therefrom. The glass plate, which is oleophilic is 25 inches wide and 24 inches long and is provided with 2 inch high 24 inch long sides beside the belt edges. The suspension spilling out of the bottom of the hopper contains 9.6 percent oil, 90.0 percent water and 0.4 percent clay and flows down along the flat plate and passes by the surfaces of the apertured belt that rotates up along the flat plate at a velocity of 0.3 feet per second. Aqueous phase that flows from the downward end of the plate is recovered in a trough from where it is pumped to a hopper of a second similar separation zone after which it is discarded. Bitumen is captured by the oleophilic belt at both separation zones and is conveyed into two separate and similar recovery zones. In each recovery zone, as illustrated in FIG. 11, a transfer roller mounted above the belt is used to transfer bitumen through the belt onto the surface of a recovery roller and a doctor blade removes the bitumen from the recovery roller surface. The bitumen product from both recovery zones is combined in a trough. The offset distance and the vertical distance between the transfer and recovery roller axes in each recovery zone is adjusted empirically to provide for optimum recovery of bitumen from the apertured belt. The bitumen removed by the doctor blades analyses 81.0 percent oil, 15.2 percent water and 3.8 percent solids.

EXAMPLE 4

A slurry or suspension of mined oil sand and water, prepared in a tumbler in the presence of oleophilic drum surfaces, steam and water is separated by the apertured oleophilic belt of FIG. 1. Two tons per hour of slurry at 150° F. containing 11.9 percent bitumen, 24.6 percent water and 63.5 percent particulate solids are conveyed to the hopper of FIG. 7 which distributes the slurry as a ribbon onto the flight of a 10 feet long, 25 inches wide conveyor consisting of an apertured endless conveyor belt stretched between two horizontally mounted end rolls. One of the endrolls is 24 inches in diameter and one endroll is 12 inches in diameter in order to provide a declining belt in the direction of belt movement. The belt is fabricated from woven nylon and coated with vulcanized neoprene. The apertures are rectangular, having a size of about 0.15 by 0.25 inches with the larger dimension in the direction of belt movement. The belt moves at a lineal velocity of 0.25 feet per second.

Under each hopper a flat plate, 24 inches long and 26 inches wide, with 2 inches high sides, is mounted directly under the belt to a pivot and an eccentric, as illustrated in FIG. 7 such that the end of the plate nearest the pivot is 6 inches beyond the center of the hopper in the direction opposite to the belt movement. When the eccentric is at the top of its upstroke the plate is parallel with the belt and 0.05 inch removed therefrom. When the eccentric is at the bottom of its down stroke the edge of the plate nearest to the pivot is 0.12 inch removed from the belt surface and the edge of the plate nearest to the eccentric is 0.35 inch removed from the belt. The eccentric shaft rotates at 120 r.p.m. to provide a 2.0 Hz. oscillation to the plate. Sprays of water at 120° F. are directed onto the plate just inside of the 2 inches high sides, to prevent slurry from reaching the belt edges, and onto the ribbon or slurry that issues from the hopper exit for the purpose of diluting the slurry on the belt. Aqueous phase that has passed through the belt apertures falls off the end of the plate in the direction of belt movement; it is discarded and it carries with it some small amount of bitumen. The remainder of the bitumen is carried by the belt into a subsequent treatment zone where the bitumen on the belt is sprayed with 75 pounds per hour of an aqueous 2.0 percent solution of sodium tripolyphosphate and 2.0 percent sodium hydroxide maintained at a temperature of about 130° F. and the bitumen is extruded back and forth through the belt apertures by a series of rollers alternately located above and below the belt. About 7.5 pounds per hour of particulate minerals are carried away by the aqueous solution leaving the belt at this stage. The bitumen on the belt is subsequently sprayed with 50 pounds per hour of a reagent containing 3.0 percent sodium oxalate and 2.0 percent of BREAXIT 7941 demulsifier at a temperature of about 130° F. and a second series of alternately located rollers are used to extrude bitumen back and forth through the belt apertures. About 3 pounds of particulate solids, containing some heavy minerals are carried away by the aqueous sodium oxalate and demulsifier solution leaving the belt. The belt is next passed by two oleophilic rollers above and below the belt that lightly touch the bitumen on the belt causing the bitumen to rupture thereby exposing aqueous droplets which are removed by blowing warm air on the belt and rollers. Two recovery rollers having oleophilic surfaces are used next to remove bitumen from the belt. One is mounted below the belt and the other is mounted above the belt 0.1 inch further along the belt in the direction of belt movement. A doctor blade and a hopper is provided at each roller to recover bitumen from the roller surface which is then conveyed by means of a diaphragm pump to storage. About 165 pounds per hour of bitumen accumulates in storage, analyzing 4.8 percent solids, 6.5 percent water and 88.7 percent oil. The belt conveyor is mounted in an enclosure that maintains an ambient temperature to the belt of 130° F.

EXAMPLE 5

One ton per hour of a suspension of sand and dispersed bitumen, containing 25.5 percent water, 65.0 percent solids and 9.5 percent oil is conveyed to the hopper of a separation zone that uses a steel mesh belt that has been coated with tin to make it oleophilic. The belt is 24 inches wide, 0.07 inches thick, with 0.2 inch square mesh apertures, and is supported by two endrolls mounted in a horizontal plane, one 24 inches diameter and the other 12 inches diameter to provide a belt decline of 0.4 inch per foot on both belt flights as illustrated in FIG. 1. Along both belt flights are mounted separation zones as illustrated in FIG. 6, treatment zones as illustrated in FIGS. 9 and 10 and recovery zones as illustrated in FIG. 13. The maximum amplitude of oscillation of the plate in the separation zone is 0.5 inch that decreases in the direction of belt movement for most of the distance along the plate and then increases thereafter for a small distance along the plate to the end of the plate. The minimum distance between the plate and the belt is 0.05 inch. Near the hopper exit, water is sprayed onto the belt to wash particulate solids through the belt apertures. Sides are provided on the plate to cause the suspension to flow towards the end of the plate where it is discarded. This discarded aqueous phase analyzes 60.3 percent water, 39.2 percent particulate solids and 0.5 percent oil. In the treatment zone an aqueous solution of 2.0 percent NALCO D-1645 non-ionic surface active compound and 2.0 percent sodium gluconate chelating agent are sprayed on to a first roller and on to the belt past this roller. Solution falling from the belt contains particulate solids and is caught by a trough. Hot flue gas from a power plant is pressurized and is blown through the nozzle of FIG. 13 at 500° F. to heat and reduce the viscosity of the bitumen and to recover it as a bitumen product. This bitumen product collects in a vessel mounted under the apertured wall of the turbulence chamber of the recovery zone of FIG. 13 and is removed therefrom for treatment by direct coking in a fluidized bed. This bitumen product is at 210° F. and analyses 97.0 percent oil, 0.5 percent water and 2.5 percent solids. In the subsequent treatment in a fluidized bed the oil of the bitumen product and the water flash off and are conveyed to further refining means and the solids of the bitumen become part of the fluidized bed.

Although the invention as has been described is deemed to be that which forms the preferred embodiments thereof, it is recognized that departures may be made therefrom and still be within the scope of the invention which is not to be limited to the details disclosed but is to be accorded the full scope of the claims so as to include any and all equivalent methods and apparatus.

I claim:

1. A method for separating water and recovering oil from a water and oil mixture which comprises the steps of:

(a) depositing said mixture onto an endless, apertured, rotating, oleophilic conveyor belt, the end rolls of which are exposed to a surrounding gaseous environment, in a separation zone such that the major portion of the oil in said mixture adheres to said belt as an oil phase with the remainder of said mixture comprising an aqueous phase passing through the apertures of said belt in said separation zone, (b) treating the oil phase adhering to said belt in a treatment zone wherein said oil phase is contacted by roller means which knead or rupture said oil phase so as to remove water contained in said oil phase and to condition said oil phase for subsequent removal from said belt, and (c) removing the oil contained in said oil phase from said belt in a recovery zone.

2. A method according to claim 1 wherein said treatment in said treatment zone comprises kneading said oil phase by transferring it from one side of said belt through said apertures to the other side one or more times by means of rollers thereby forcing water from said oil phase.

3. A method according to claim 2 wherein a reagent is added to said oil phase prior to said kneading operation.

4. A method according to claim 3 wherein said reagent is a demulsifier.

5. A method according to claim 3 wherein said reagent is a hydrophilic surface active transfer agent and water removed from said oil phase contains siliceuous particulate solids.

6. A method according to claim 3 wherein said reagent is a chelating agent and water removed from said oil contains particles of heavy minerals.

7. A method according to claim 3 wherein said reagent is a solvent derived from oil.

8. A method according to claim 3 wherein said reagent is sprayed onto said oil phase on said belt.

9. A method according to claim 3 wherein said reagent is contained in a bath into which one of the rollers involved in said kneading operation is partially immersed.

10. A method according to claim 1 wherein in said treatment zones treatment comprises lightly contacting the oil phase on said belt with at least one oleophilic roller causing said oil phase to rupture with part of the oil in said phase remaining on the belt and part adhering to the oleophilic roller thereby exposing water droplets which are removed.

11. A method according to claim 10 wherein said water droplets are removed by blowing a gaseous stream onto the surface of the ruptured oil phase adhering to the roller and belt.

12. A method according to claim 2 wherein said treatment also comprises lightly contacting the oil phase on said belt with at least one oleophilic roller causing said oil phase to rupture with part of the oil in said phase remaining on the belt and part adhering to the oleophilic roller thereby exposing water droplets which are removed.

13. A method for separating a dispersed oil phase from a continuous aqueous phase in a suspension of said phases wherein either of said phases may also contain particulate solids, which comprises depositing said suspension onto a rotating, apertured, oleophilic endless conveyor belt the endrolls of which are exposed to a surrounding gaseous environment in a separation zone wherein the area immediately below the belt in said separation zone contains a floor which receives and supports materials passing through the apertures of said belt while in the separation zone thereby prolonging contact of said belt with said suspension and thereby increasing the liklihood for all of the dispersed oil phase in said suspension to come in contact with the oleophilic belt such that oil phase adheres to the oleophilic belt and aqueous phase and any particulate solids contained therein, along with any non-adhering oil phase, pass through the apertures of said belt and are removed.

14. A method according to claim 13 wherein said floor is stationary.

15. A method according to claim 13 wherein said floor is a moving conveyor belt.

16. A method according to claim 13 wherein said floor is a driven roller rotating in the direction of belt movement.

17. A method according to claim 13 wherein the belt is contained between two end rolls one of which has a larger diameter than the other such that the belt declines in the direction of rotation and the floor is also sloped.

18. A method according to claim 13 wherein the floor oscillates thereby causing at least part of the aqueous phase and non-adhering oil phase to pass through said apertures a plurality of times.

19. A method according to claim 18 wherein the floor oscillates with varying amplitude.

20. A method according to claim 19 wherein the floor oscillates with the amplitude of oscillation decreasing in the direction of belt movement.

21. A method according to claim 19 wherein the floor oscillates with the amplitude of oscillation increasing in the direction of belt movement.

22. A method according to claim 13 wherein the rotating belt containing adhering oil phase passes into a recovery zone wherein oil phase adhering to said belt is removed.

23. A method according to claim 21 wherein said oil phase is removed from said belt in said recovery zone by one or more driven oleophilic recovery rollers which are in contact with the oil phase on said belt.

24. A method according to claim 23 wherein the oil adhering to said recovery rollers is removed therefrom by means of a doctor blade into means which convey said removed oil from the vicinity of said belt for further processing.

25. A method according to claim 23 wherein a transfer roller is used to push oil on said belt through apertures therein and onto a recovery roller.

26. A method according to claim 25 wherein the transfer roller is offset from the recovery roller for a positive distance in the direction of belt movement which distance does not exceed one-recovery roller diameter.

27. A method according to claim 26 wherein the transfer roller has an oleophilic surface.

28. A method according to claim 27 wherein there is a small clearance between the surfaces of the recovery roller and the transfer roller which permits the flow of oil through the belt apertures onto the surface of said recovery rollers.

29. A method according to claim 22 wherein said oil phase is removed from said belt in said recovery zone by blowing a concentrated steam of hot gas onto the surface of said belt thereby reducing the viscosity of said oil and causing it to flow from said belt into means which convey said oil from the vicinity of said belt for further processing.

30. A method according to claim 29 wherein said hot gas flows through the apertures of said belt and is deflected past the oil on the belt backward relative to belt movement so as to preheat the oil on said belt prior to its removal.

31. A method according to claim 30 wherein said hot gas is a member selected from the group consisting of steam, air, combustion product gases, process gas and flue gas.

32. A method according to claim 22 wherein the rotating belt containing adhering oil phase first passes from said separation zone into a treatment zone wherein said oil phase is treated to remove water therefrom and to condition the oil for subsequent removal and is then passed to said recovery zone for oil phase removal.

33. A method according to claim 32 wherein said treatment in said treatment zone comprises kneading said oil phase by transfering it from one side of said belt through said apertures to the other side one or more times by means of rollers thereby forcing water from said oil phase.

34. A method according to claim 33 wherein a reagent is added to said oil phase prior to said kneading operation and is admixed therewith by the kneading.

35. A method according to claim 34 wherein said reagent is a demulsifier.

36. A method according to claim 34 wherein said reagent is a hydrophilic surface active transfer agent and water removed from said oil contains siliceous particulate solids.

37. A method according to claim 34 wherein said reagent is a chelating agent and water removed from said oil contains particles of heavy minerals.

38. A method according to claim 34 wherein said reagent is a solvent derived from oil.

39. A method according to claim 34 wherein said reagent is sprayed onto said oil phase on said belt.

40. A method according to claim 34 wherein said reagent is contained in a bath into which one of the rollers involved in said kneading operation is partially immersed.

41. A method according to claim 32 wherein in said treatment zone treatment comprises of lightly contacting the oil phase on said belt with at least one oleophilic roller causing said oil phase to rupture with part of the oil in said phase remaining on the belt and part adhering to the oleophilic roller thereby exposing water droplets which are removed.

42. A method according to claim 41 wherein said water droplets are removed by blowing a gaseous stream onto the surface of the ruptured oil phase adhering to the roller and belt.

43. A method according to claim 33 wherein said treatment also comprises lightly contacting the oil phase on said belt with at least one oleophilic roller causing said oil phase to rupture with part of the oil remaining on the belt and part adhering to the oleophilic roller thereby exposing water droplets which are removed.

44. A method according to claim 32 wherein said belt contains a plurality of zones for simultaneously separating oil phase from aqueous phase on said belt, treating said oil phase on said belt and removing oil from said oil phase from said belt at more than one location.

45. A method according to claim 32 wherein said belt is horizontal.

46. A method according to claim 32 wherein said belt inclines in direction of movement.

47. A method according to claim 32 wherein said belt declines in direction of movement.

* * * * *